(12) United States Patent
Atluri et al.

(10) Patent No.: US 10,373,513 B2
(45) Date of Patent: Aug. 6, 2019

(54) MOTION PLATFORM SYSTEM

(75) Inventors: Kishore Dutt Atluri, Andhra Pradesh (IN); Ravikumar Midathala, Andhra Pradesh (IN)

(73) Assignee: ZEN TECHNOLOGIES LIMITED, Industrial Estate, Sanath Nagar Hyderabad Andhra Pradesh (IN)

( * ) Notice: Subject to any disclaimer, the term of this patent is extended or adjusted under 35 U.S.C. 154(b) by 2264 days.

(21) Appl. No.: 13/378,918

(22) PCT Filed: Jun. 16, 2010

(86) PCT No.: PCT/IN2010/000412
§ 371 (c)(1),
(2), (4) Date: May 22, 2012

(87) PCT Pub. No.: WO2011/001447
PCT Pub. Date: Jan. 6, 2011

(65) Prior Publication Data
US 2012/0267504 A1    Oct. 25, 2012

(30) Foreign Application Priority Data
Jun. 16, 2009  (IN) ........................... 1408/CHE/2009

(51) Int. Cl.
*G09B 9/12*     (2006.01)
*A63G 31/16*    (2006.01)

(52) U.S. Cl.
CPC ..................................... *G09B 9/12* (2013.01)

(58) Field of Classification Search
CPC .......... A63G 7/00; A63G 31/00; A63G 31/16; A63B 69/00; A63B 9/00; A63B 9/08;
(Continued)

(56) References Cited

U.S. PATENT DOCUMENTS 3,645,011 A   2/1972  Callanen
6,027,342 A   2/2000  Brown
(Continued)

FOREIGN PATENT DOCUMENTS

CN           201255936       6/2009

OTHER PUBLICATIONS

ISR from corresponding application No. PCT/IN2010/000412.

*Primary Examiner* — Kien T Nguyen (57) ABSTRACT

A motion platform system for displacing the top frame in three degrees of translational freedom and three degrees of rotational freedom along and about the three axes comprising a base frame, a middle frame, a center column and six actuators and; wherein said base frame is connected to said middle frame by three links capable of providing translational freedom to the said middle frame, said center column and said top frame along the X-axis and Y-axis and sway actuator and surge actuator to control the said translational freedom; said middle frame is connected to said center column by a cylindrical joint capable of providing translational and rotational freedom to the said center column and said top frame along and about the Z-axis and heave actuator and yaw actuator to control the said translational and rotational freedom; said center column is connected to said top frame by a joint capable of providing rotational freedom to the said top frame about the X-axis and Y-axis and pitch actuator and roll actuator to control the said rotational freedom.

7 Claims, 8 Drawing Sheets

(58) Field of Classification Search
CPC .... B06B 3/00; G09B 9/00; G09B 9/02; G09B 9/08; G09B 9/12
USPC .......... 472/59–61, 130; 434/29, 55
See application file for complete search history.

(56) References Cited

U.S. PATENT DOCUMENTS 6,077,078 A * 6/2000 Alet ................ F16M 11/046
  434/29
6,445,960 B1 * 9/2002 Borta ................ G09B 9/02
  434/30

* cited by examiner

MOTION PLATFORM SYSTEM

CROSS-REFERENCE TO RELATED APPLICATIONS

The present application is a National Phase of International Application Number PCT/IN2010/000412, filed Jun. 16, 2010 and claims priority from, India Application Number 1408/CHE/2009, filed Jun. 16, 2009.

TECHNICAL FIELD

The present invention relates to a motion platform system. Particularly, the present invention relates to a motion platform system for displacing a moving platform (top frame) and, in particular, relates to a motion platform system that drives the top frame in six degrees of freedom.

BACKGROUND

A motion platform system is a device that imparts a translational or a rotary motion or both, to an equipment coupled to a simulator. Usually, such simulators have a moving platform connected to a fixed base. The platform is movable with respect to its base, and has a freedom of motion in all the three axes of a coordinate system, i.e., X, Y, and Z. Specifically, the platform is enabled by an actuating system to undergo any type of motion along or about the three axes.

For example, motion simulators can be employed to provide a virtual helicopter or cockpit environment for trainee pilots. The motion platform in such cases is used to mount an enclosure in a way that the enclosure undergoes various types of motions in sync with the motion of the motion platform. In this way, the moving enclosure gives a person sitting inside the enclosure an apparent feeling of a ride inside an actual helicopter, a space vehicle, etc. On similar lines, the motion simulators are used in amusement parks to give a patron an apparent feeling of riding or flying in virtual space. In such cases, the motion of the enclosure is synchronized with a series of running sequences in a movie that is telecast at a giant screen in front of the patron.

Conventional motion simulators consist of a planar spatial frame connected to the fixed base. The spatial frame is supported on the fixed, grounded base with the help of a number of linear actuators. At least six linear actuators or kinematic legs connect the grounded base to the spatial frame. The connection of each actuator is implemented with the help of movable joints. By virtue of a characteristic of length variation associated with the linear actuators, motion of the spatial frame in all three axes is achieved. Additionally, the spatial frame is enabled to be in motion in accordance with any sort of translational or rotary motion in the three axes.

However, in order to achieve a single degree of freedom associated with the spatial frame, more than one actuator is operated by the motion simulator. Typically, for any sort of movement, all the actuators need to be moved simultaneously with varying velocities. Hence, even if a less degree of freedom is required for a particular movement, all the actuators connected between the spatial frame and the grounded base are operated. Further, in case an end of the spatial frame is lifted so as to accomplish the rotary motion, the total load of the enclosure mounted on the spatial frame is directly on the actuators.

Furthermore, the design of the conventional motion simulators is highly complex. Maintenance and upkeep costs associated with these complex simulators are also high. Moreover, the actuators employed in the conventional motion simulators are of a high power rating, thereby leading to excessive power consumption and an increase in the operating cost.

SUMMARY

The present subject matter relates to a motion platform system for displacing a moving platform in six degrees of freedom, both along and about all three coordinate axes of the moving platform. The moving platform can be used to mount a payload or an enclosure like a cockpit. The motion platform system, hereinafter system, includes a fixed base, a middle frame, a centre column, and the moving platform.

The present invention relates to a motion platform system for displacing the top frame at least in one degree of freedom (and in a preferred embodiment, in six degrees of freedom) along and/or about the three axes comprising: a base frame, a middle frame, and a centre column, wherein the said base frame is connected to said middle frame by connector means capable of providing translational freedom to the said middle frame, said centre column and said top frame at least along the X-axis and/or Y-axis and means to control the said translational freedom; the said middle frame is connected to said centre column by connector means capable of providing at least translational and/or rotational freedom to the said centre column and said top frame along and/or about the Z-axis and means to control the said translational and/or rotational freedom; and the said centre column is connected to said top frame by connector means capable of providing rotational freedom to the said top frame at least about the X-axis and/or Y-axis and means to control the said rotational freedom.

The motion platform system includes a top frame operably coupled to a base frame. The motion platform system also includes one or more actuators to provide six degrees of freedom to the top frame relative to the base frame. The six degrees of freedom include three rotational degrees of freedom about an axes system and three translational degrees of freedom along the axes system. Each actuator is configured to provide one degree of freedom to the top frame. For example, a sway actuator coupled to the base frame can provide a translational motion to the top frame along an X-axis. Moreover, no other actuator needs to be activated while providing the translational motion.

As the motion platform system of the present subject matter enables control of each degree of freedom individually and independently through an actuator, the power consumed for motion of a particular degree of freedom is considerably low and thus, results in savings for a consumer.

These and other features, aspects, and advantages of the present subject matter will be better understood with reference to the following description and appended claims. This summary is provided to introduce a selection of concepts in a simplified form. This summary is not intended to identify key features or essential features of the claimed subject matter, nor is it intended to be used to limit the scope of the claimed subject matter.

BRIEF DESCRIPTION OF THE DRAWINGS

The above and other features, aspects and advantages of the subject matter will be better understood with regard to the following description, appended claims, and accompanying drawings where:

DETAILED DESCRIPTION

The present subject matter relates to a motion platform system for displacing the top frame in six degrees of freedom, along and about the three coordinate axes. The top frame may be used to mount a payload or an enclosure. In an embodiment the system is stacked in the following order: a base frame at the bottom, a middle frame on top of the base frame, a centre column mounted over the middle frame, and the top frame at the top.

The connection at each level or junction of the framework is implemented with the help of joints and links or actuators. Further, the arrangement of linear actuators in the network is such that for each degree of freedom, one linear actuator operates. Every actuator employed in the system is extendable and is capable of connecting different components of the motion platform system with the help of joints. An actuator of the set of actuators is configured to provide a motion in one of the six degrees of freedom, namely translational and/or rotational degrees of freedom. The types of motion covered by the six degrees of freedom include translational motion along an axis in the three axes and the rotary motion about an axis in the three axes.

In order to move the top frame to a predetermined degree of freedom, only a particular actuator operates while the rest remain non-operative. Accordingly, the power consumption associated with a particular degree of freedom is considerably less. Moreover, the breakdown of one linear actuator keeps the movement of the top frame in other degrees of freedom unaffected. In addition, if a particular degree of freedom is not desired from the present system, then the actuator dedicated to that degree may be replaced by a link.

Further, for a degree of freedom that defines lifting of the top frame, a resilient biased force can be employed to reinforce the operation of the actuator with the compressive force. A preferred embodiment of the present invention can be described by using a spring for achieving the resilient biased force. In this case, the payload mounted on the top frame is supported by the actuator as well as the spring. This prevents the employment of high power rating actuators. In addition, due to the load sharing by the spring, the operating life of the actuators is also increased.

Figure 1:
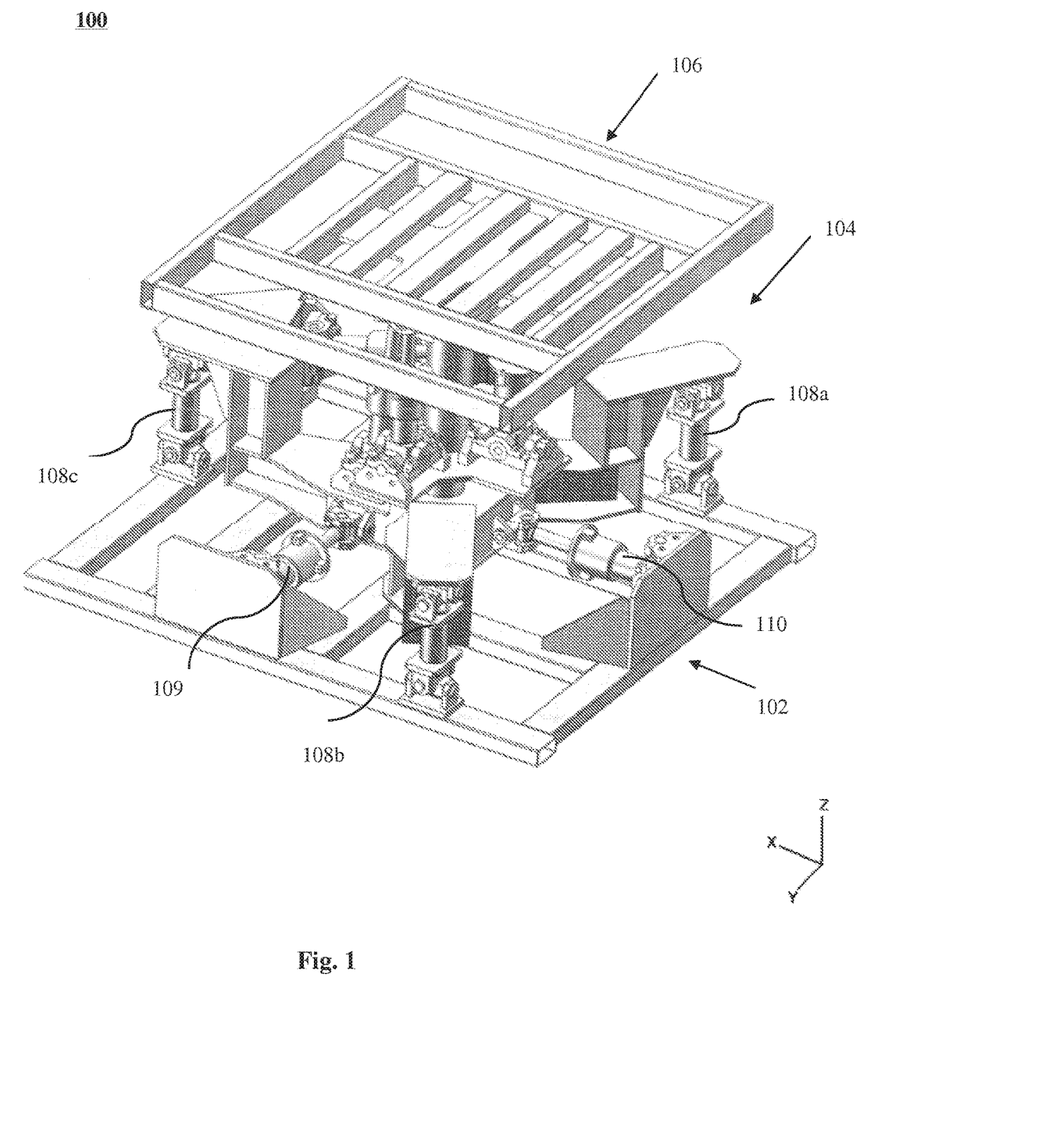
FIG. 1 shows an isometric view of a motion platform system, according to one embodiment.

FIG. 1 shows the isometric view of a motion platform system 100, in accordance with an embodiment of the present subject matter.

As shown, the motion platform system 100 of the present subject matter includes a base frame 102, a middle frame 104, and a top frame 106. In between the middle frame 104 and the top frame 106, a centre column (not numbered in the figure) is disposed. The middle frame 104 is connected to the base frame 102 with the help of links 108a, 108b, and 108c. These links (108a, 108b, and 108c) have universal joints placed at their upper ends and lower ends, thereby forming a movable connection between the middle frame 104 and the base frame 102.

The motion platform system 100 also includes a surge actuator 109 and a sway actuator 110, which are connected between the middle frame 104 and the base frame 102 with help of joints located at both ends of the actuators. The surge actuator 109 and the sway actuator 110 are configured to provide translational motion to the middle frame 104 relative to the base frame 102, along the Y and X axes of the fixed base frame 102, respectively.

Specifically, during operation of either of these actuators 109 and 110, the links 108a, 108b and 108c undergo a partial rotary motion about their lower ends connected to the base frame 102. The rotary motion of the links 108a, 108b, and 108c facilitates the translational motion of the middle frame 104 along the X and Y axes.

Further, the translational motion of the middle frame 104 gets transmitted to the top frame 106. Accordingly, the middle frame 104, the center column, and the top frame 106 undergo the translational motion by the actuators 109 and 110 either along the X-axis or the Y-axis or both the axes, simultaneously, as one entity, and relative to the base frame 102. The middle frame 104 thus facilitates in providing translational degrees of freedom along the Y and the X axes to the top frame 106.

Figure 2:
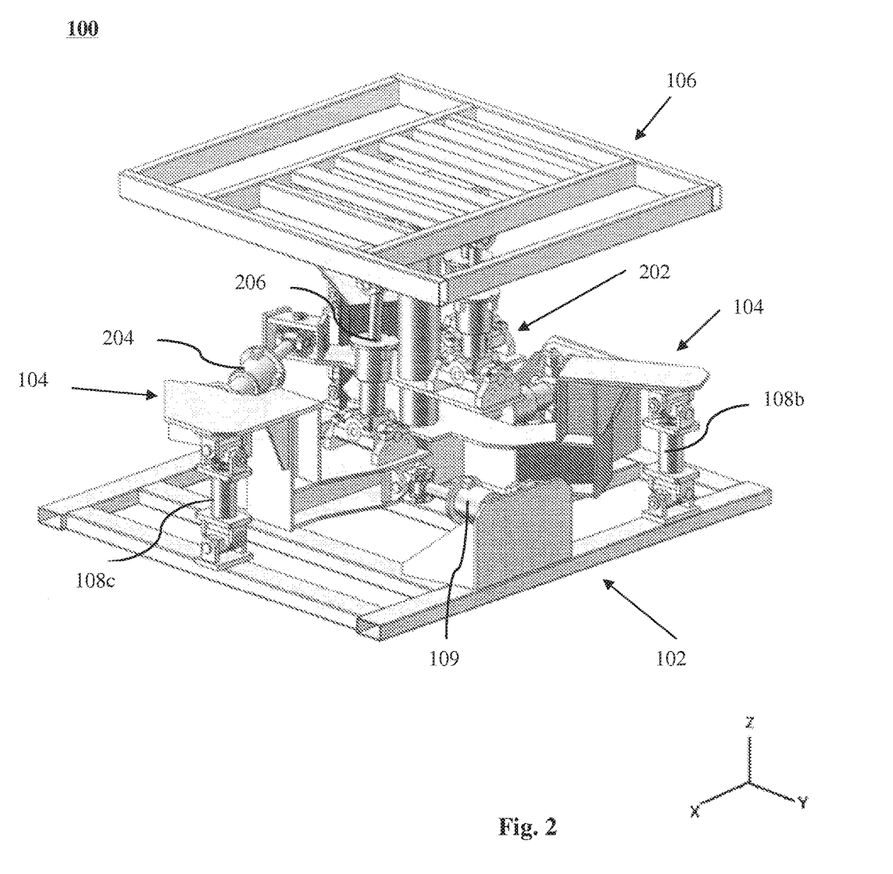
FIG. 2 shows another isometric view of the motion platform system of FIG. 1.

FIG. 2 shows an isometric view of the motion platform system 100 when rotated 90 degrees in counterclockwise direction about its Z-axis with respect to FIG. 1.

As shown in the present figure, the motion platform system 100 includes, in addition to the constituents of the motion platform system 100 described in FIG. 1, the centre column 202 disposed between the middle frame 104 and the top frame 106. The system 100 further includes a yaw actuator 204 and a heave actuator 206, both movably disposed between the middle frame 104 and the centre column 202. The centre column 202 is facilitated to undergo the translational motion as well as the rotary motion along and about the Z-axis by the operation of the heave actuator 206 and the yaw actuator 204, respectively. This type of motion described by the center column 202 is relative to the middle frame 104 and base frame 102 and gets transmitted to the top frame 106, thereby enabling simultaneous motion of the top frame 106 with respect to the middle frame 104 and base frame 102.

Figure 3:
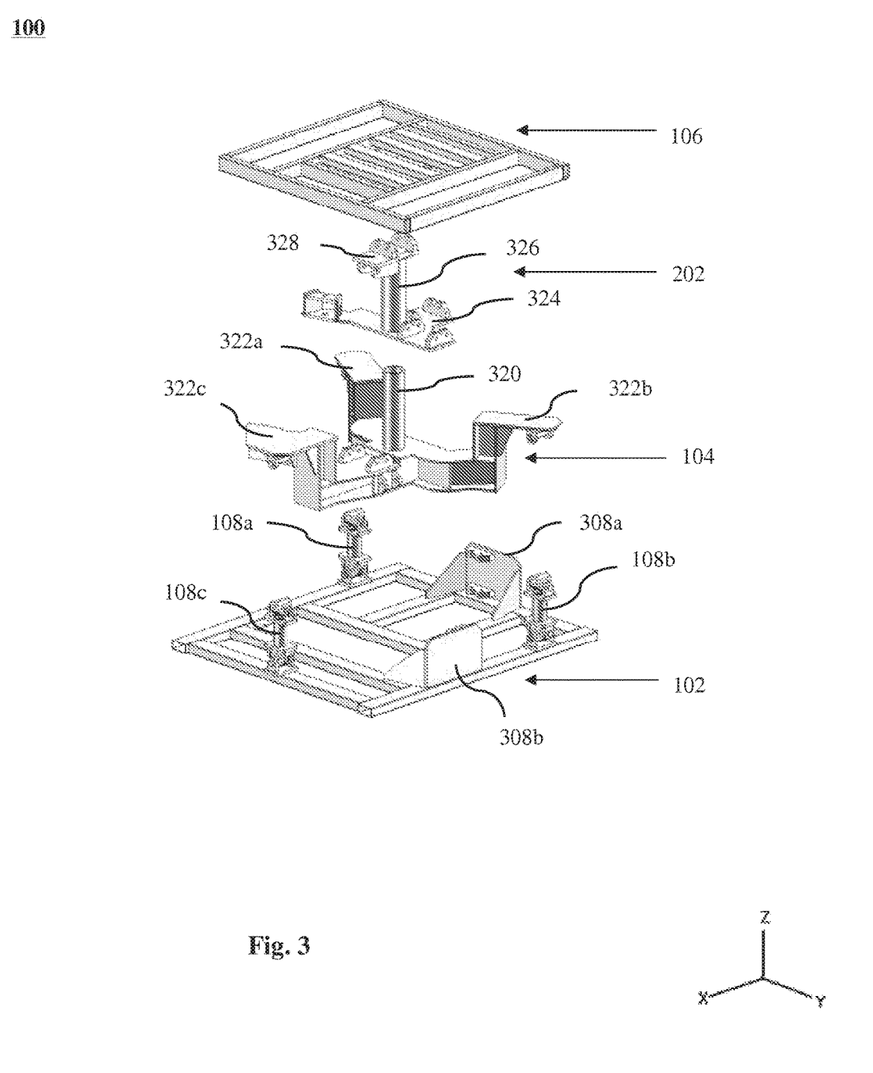
FIG. 3 shows an exploded isometric view of the motion platform system of FIG. 1, according to one embodiment.

FIG. 3 shows an exploded isometric view of the motion platform system 100 when rotated 90 degrees counterclockwise about its Z-axis with respect to FIG. 1. As shown, the motion platform system 100 is stacked in the following order starting from the base frame 102 at the bottom, the middle frame 104 on top of the base frame 102, the centre column 202 mounted over the middle frame 104, and the top frame 106 at the top. Further, as depicted in the FIG. 3, the base frame 102 includes a pair of upstanding brackets 308a and 308b. Also, the middle frame 104 includes a cylindrical guide 320 and three supporting plates 322a, 322b, and 322c. The supporting plates 322a, 322b, and 322c and the cylindrical guide 320 are fixedly mounted on the middle frame 104. Likewise, the center column 202 includes a base plate 324, a cylindrical tube 326 and an upper plate 328. The cylindrical tube 326 is fixedly mounted on the base plate 324 through the base plate 324. The upper plate 328 is rigidly mounted to the cylindrical tube 326.

The brackets 308a and 308b facilitate holding of the sway actuator 110 and the surge actuator 109, respectively, at the base frame 102. The supporting plates 322a, 322b, and 322c facilitate connection of the middle frame 104 to the base frame 102 through the links 108a, 108b and 108c. The cylindrical tube 326 is concentrically disposed over the cylindrical guide 320 to facilitate the rotary motion as well as translational motion of the centre column 202 with respect to the middle frame 104 and base frame 102.

The interfacing of different components of the motion platform system 100 can now be explained with reference to FIG. 4-7, in a stacked relationship as explained earlier, starting from the interfacing of the base frame 102 with the middle frame 104.

Figure 4:
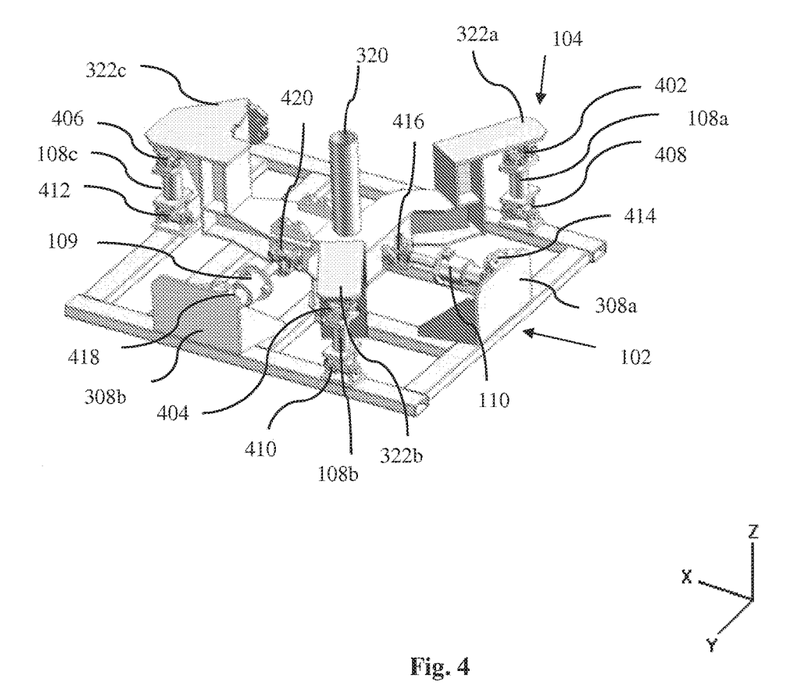
FIG. 4 shows an isometric view of a base frame and a middle frame of the motion platform system of FIG. 1, according to an embodiment of the present subject matter.

FIG. 4 shows the isometric view of the base frame 102 and the middle frame 104 with the cylindrical guide 320 such that when the motion platform system 100 has been rotated by 90° clockwise about its Z axis, with respect to FIG. 3.

The base frame 102 is connected to the supporting plates 322a, 322b and 322c of the middle frame 104 with the help of movable connections provided by the corresponding links 108a, 108b, and 108c. Specifically, upper universal joints 402, 404, and 406 connect the links 108a, 108b, and 108c with the supporting plates 322a, 322b and 322c in a corresponding manner. On the other hand, lower universal joints 408, 410 and 412 connect the links 108a, 108b, and 108c with the base frame 102.

The length of the sway actuator 110 controls the linear displacement of the middle frame 104 in its X-axis relative to the base frame 102. Likewise, the length of the surge actuator 109 controls the linear displacement of the middle frame 104 in its Y-axis, relative to base frame 102. In addition, one end of the sway actuator 110 is connected to the upstanding bracket 308a of the base frame 102 with the help of a joint 414 and the other end is connected to the middle frame 104 with another joint 416. Such a connection achieves a line of actuation of the sway actuator 110 directed along the X-axis.

Similarly, one end of the surge actuator 109 is connected to the upstanding bracket 308b of the base frame 102 with the help of a joint 418 and the other end is connected to the middle frame 104 with another joint 420. This connection achieves a line of actuation of the surge actuator 109 directed along the Y-axis.

The linear displacements of the middle frame 104 along the X-axis and the Y-axis are transmitted to the top frame 106 via the centre column 202. As a result, the top frame 106, the centre column 202, and the middle frame 104 undergo the translational motion as one entity, relative to the base frame 102.

Figure 5A:
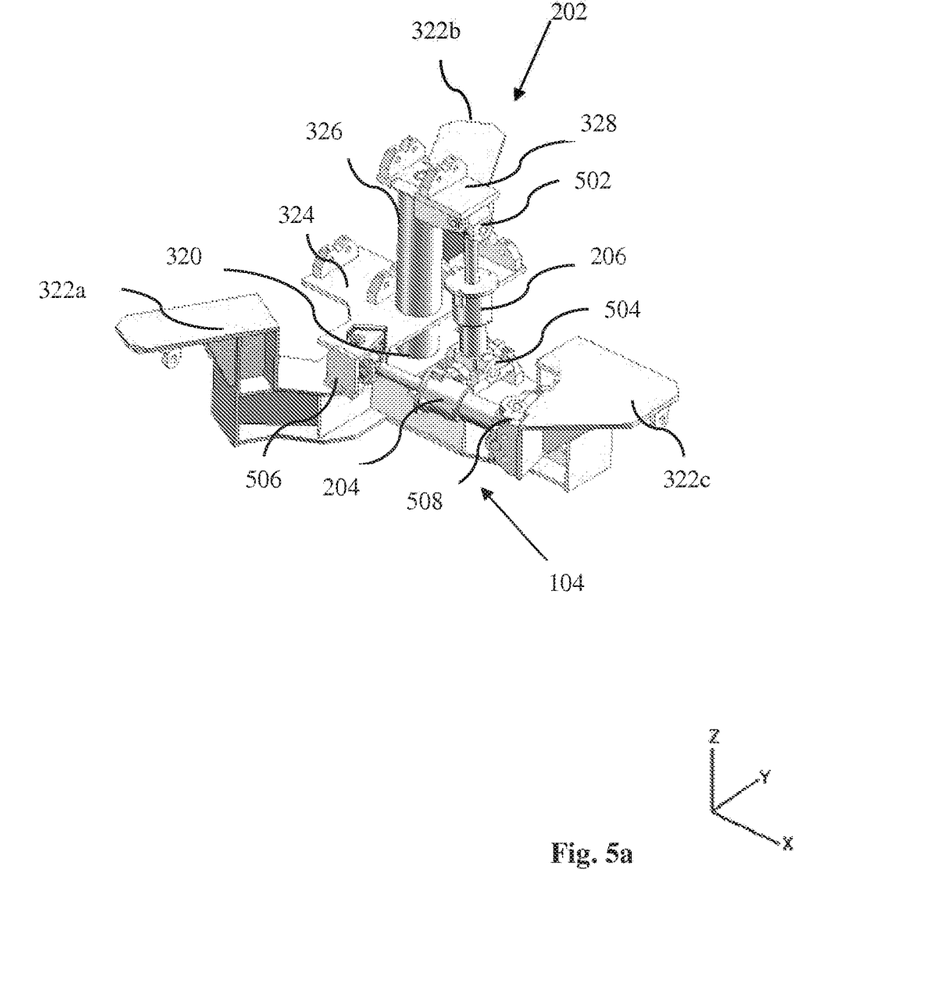
FIG. 5a shows an isometric view of the middle frame and a centre column of the motion platform system of FIG. 1, according to an embodiment of the present subject matter.

FIG. 5a shows an isometric view of a combination of the middle frame 104 and the centre column 202 such that when the motion platform system 100 has been rotated 180° counterclockwise about its Z-axis with respect to FIG. 4.

Figure 5B:
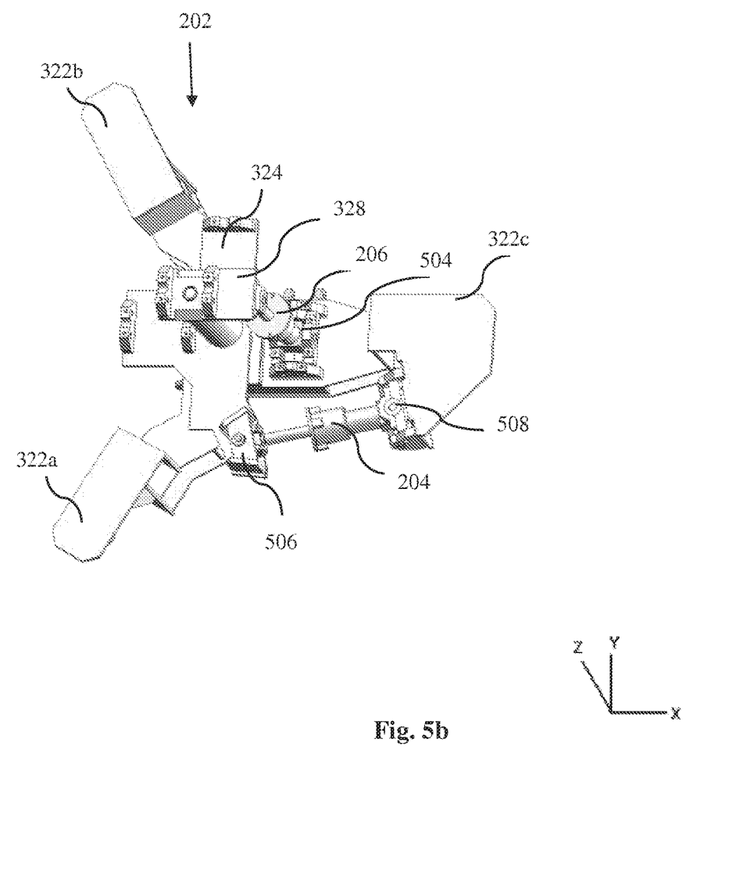
FIG. 5b shows another isometric view of the middle frame and the centre column of the motion platform system of FIG. 1, according to an embodiment of the present subject matter.

FIG. 5b shows a top view of the combination depicted in FIG. 5a, such that when the motion platform system 100 has been rotated 45° counterclockwise about its Z-axis with respect to FIG. 5a.

As discussed before, the cylindrical tube 326 is concentrically disposed over the cylindrical guide 320, which is rigidly and vertically mounted on the middle frame 104, thereby forming a cylindrical pair. This concentric disposal facilitates the translational motion of the centre column 202 along the Z-axis and rotational motion about the Z-axis relative to the middle frame 104 and the base frame 102. Thus, the cylindrical pair, i.e. the cylindrical guide 320 along with the middle frame 104, facilitates in providing a translational and a rotational degree of freedom along and about the Z-axis to the top frame 106. The translational motion of the cylindrical pair is controlled by the heave actuator 206.

In one implementation, one end of the heave actuator 206 is movably connected to the upper plate 328 of the centre column 202 with a joint 502. The other end of the heave actuator 206 is connected to the middle frame 104 with another joint 504. The length of the heave actuator 206 controls the translational motion of the centre column 202 along the Z-axis. This translational motion along the Z-axis is transmitted to the top frame 106, thereby enabling a simultaneous motion of the top frame 106 relative to the middle frame 104 and the base frame 102.

Further, the rotational motion of the centre column 202 about the Z-axis is controlled by the yaw actuator 204. One end of the yaw actuator 204 is connected to the base plate 324 of the centre column 202 with a joint 506. The other end of the yaw actuator 204 is connected to the supporting plate 322c of the middle frame 104 with another joint 508. The length of the yaw actuator 204 controls the rotation of the base plate 324 of the centre column 202 about the Z-axis, with respect to the middle frame 104 and base frame 102.

This angular displacement of the centre column 202 about the Z-axis is transmitted to the top frame 106, thereby enabling a simultaneous motion of the top frame 106 relative to the middle frame 104 and the base frame 102.

Figure 6:
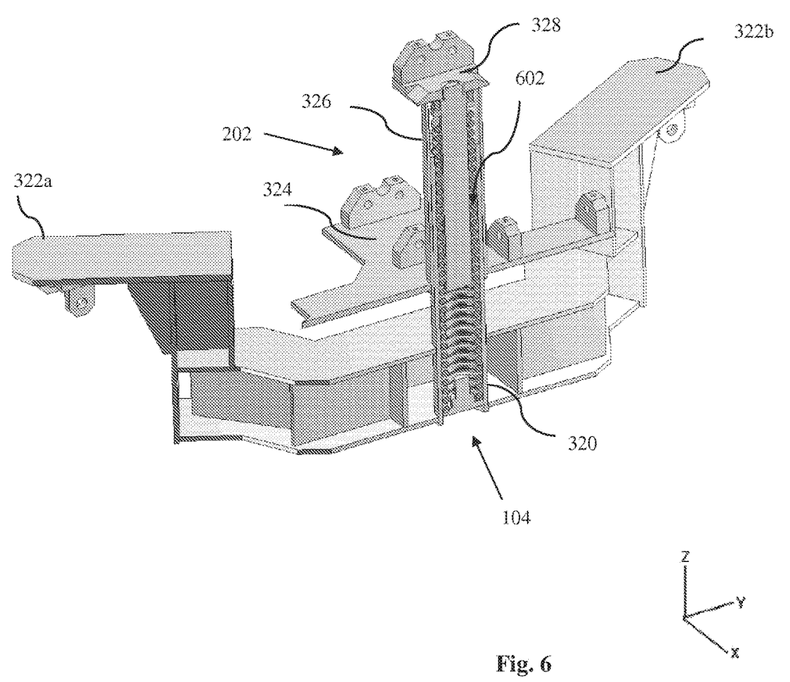
FIG. 6 shows a cross sectional view of the middle frame and the centre column of the motion platform system of FIG. 1, according to an embodiment of the present subject matter.

FIG. 6 shows a cross sectional view of the middle frame 104 and the centre column 202 of the motion platform system 100, according to an embodiment. The cut of the section has been made along its Z-axis at the Y-Z plane. The cross sectional view is similar in direction with respect to FIG. 5a. Accordingly, the cross sectional view depicts a sectional view of the aforementioned cylindrical pair.

As shown, a compression spring 602 is located concentrically inside the cylindrical tube 326 and is firmly suspended from the upper plate 328 of the centre column 202. When the cylindrical pair is formed, the spring 602 gets compressed by the virtue of the concentric placement of the cylindrical guide 320 inside the cylindrical tube 326. When the heave actuator 206 operates to move or lift the centre column 202 and the top frame 106 along the Z-axis, the compressive force of the compressed spring 602 reinforces the operation performed by the heave actuator 206.

Figure 7:
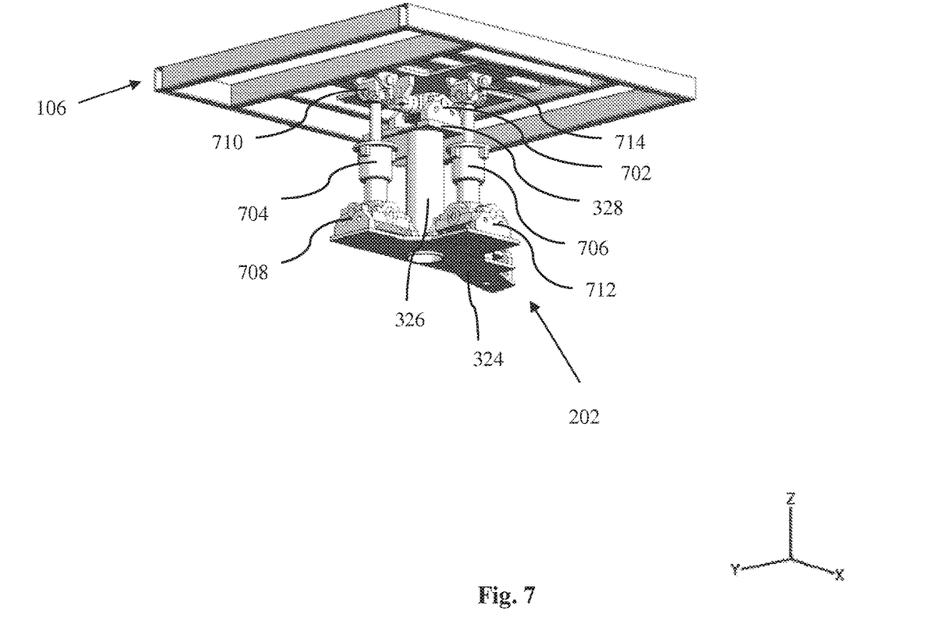
FIG. 7 shows an isometric view of the centre column as shown in any of the FIGS. 5a, 5b, and 6 with a top frame, according to an embodiment of the present subject matter.

FIG. 7 shows an isometric view from the bottom of the cylindrical tube 326 with its base plate 324, the top frame 106, a top central joint 702 along with a pitch actuator 704, and a roll actuator 706 such that when the motion platform system 100 has been rotated by 180° counterclockwise about its Z axis with respect to FIG. 5a.

As shown in FIG. 7, the top frame 106 is attached to the upper plate 328 of the centre column 202 with a top central joint 702. The top central joint 702 facilitates the rotary motion to the top frame 106 about the X-axis and the Y-axis, relative to the centre column 202. This rotary motion about the X and Y axes is governed by the pitch actuator 704 and the roll actuator 706.

Specifically, the rotation of the top frame 106 about its X-axis relative to the centre column 202 is controlled by the length of the pitch actuator 704. The pitch actuator 704 provides a rotational degree of freedom about the X-axis to the top frame 106. One end of the pitch actuator 704 is connected to the base plate 324 of the centre column 202 with a joint 708 at a point on the Y-axis of the base plate 324.

Likewise, the other end of the pitch actuator 704 is connected to the top frame 106 with a joint 710 on the Y-axis of the top frame 106.

The rotation of the top frame 106 about its Y-axis relative to the centre column 202 is controlled by the length of the roll actuator 706. The roll actuator 706 provides a rotational degree of freedom about the Y-axis to the top frame 106. One end of the roll actuator 706 is connected to the base plate 324 of the centre column 202 with a joint 712 at a point on X-axis of the base plate 324 of the centre column 202. Likewise, the other end is connected to the top frame 106 with a joint 714 on the X-axis of the top frame 106.

With reference to the explanation of FIGS. 4-7, it may be inferred that the top frame 106 has six degrees of freedom. These six degrees of freedom include the translational motion along the X, Y, and Z axes and the rotary motion about the same axes. Specifically, the top frame 106 undergoes the rotary motion about the X and Y axes relative to the centre column 202, middle frame 104 and base frame 102 respectively. In terms of the rotary motion about the Z axis and the translational motion along the Z axis, the top frame 106, along with the centre column 202, undergoes the same relative to the middle frame 104 and the base frame 102, respectively. Also, the top frame 106, along with the centre column 202 and the middle frame 104 as one unit, undergoes the translational motion along the X and Y axes, relative to the stationary base frame 102.

Further it may also be inferred from the aforementioned explanation that the presence of six independent linear actuators facilitates six degrees of freedom for the present motion platform system 100.

In another embodiment, the motion platform system 100 may enable the top frame 106 to undergo a type of motion that is formed out of a combination of different degrees of freedom. As an example, the top frame 106 may simultaneously undergo the translational motion along the Z axis as well as the rotary motion about the X axis.

The previously described versions of the subject matter and its equivalent thereof have many advantages, including those which are described herein.

The motion platform system 100 prevents the employment of high power rating linear actuators to provide motion. Specifically, the load during a lifting process is shared by the heave actuator 206 and the compression spring 602.

Further, the motion platform system 100 facilitates movement in any degree of freedom by operating only one concerned linear actuator or by changing the length of a particular linear actuator. In addition, maximum displacement is achievable in all the six degrees of freedom.

In another embodiment, the actuator provided in the system 100 can be an electrical actuator, a hydraulic actuator, or a pneumatic actuator.

Furthermore, the present system 100 provides flexibility to replace any number of actuators using the links, if desired, to lessen the degree of freedom of the top frame 106 in one or more directions.

Although the present subject matter has been described in considerable detail with reference to certain preferred embodiments thereof, other embodiments are possible. As such, the spirit and scope of the appended claims should not be limited to the description of the preferred embodiment contained therein.

We claim:

1. A motion platform system for displacing a top frame at least in one degree of freedom along and/or about the three axes comprising:
   a. a base frame;
   b. a middle frame; and
   c. a centre column;
   wherein:
   said base frame is connected to said middle frame by connector means capable of providing translational freedom to the said middle frame, said centre column and said top frame at least along the X-axis and/or Y-axis and means to control the said translational freedom;
   said middle frame is connected to said centre column by connector means capable of providing at least translational and/or rotational freedom to the said centre column and said top frame along and/or about the Z-axis and means to control the said translational and/or rotational freedom;
   said centre column is connected to said top frame by connector means capable of providing rotational freedom to the said top frame at least about the X-axis and/or Y-axis and means to control the said rotational freedom.

2. A motion platform system as claimed in claim 1, wherein said centre column includes a resilient biased force.

3. A motion platform system as claimed in claim 2, wherein said resilient biased force is achieved by means of a spring.

4. A motion platform system as claimed claim 1, wherein said means to control the freedom comprises of an actuator.

5. A motion platform system as claimed in claim 4, wherein said actuator is electrical, hydraulic or pneumatic.

6. A motion platform system for displacing a top frame in three degrees of translational freedom and three degrees of rotational freedom along and about the three axes comprising:
   a. a base frame;
   b. a middle frame;
   c. a centre column; and
   d. six actuators;
   wherein:
   said base frame is connected to said middle frame by three links capable of providing translational freedom to the said middle frame, said centre column and said top frame along the X-axis and Y-axis and sway and surge actuators to control the said translational freedom;
   said middle frame is connected to said centre column by a cylindrical joint capable of providing translational and rotational freedom to the said centre column and said top frame along and about the Z-axis and heave and yaw actuators to control the said translational and rotational freedom;
   said centre column is connected to said top frame by a joint capable of providing rotational freedom to the said top frame about the X-axis and Y-axis and pitch and roll actuators to control the said rotational freedom.

7. A motion platform system for displacing a top frame in one degree of translational freedom in Z-axis and three degrees of rotational freedom about the three axes comprising:
   a middle frame;
   b. a centre column; and
   c. four actuators;
   wherein:
   said middle frame is mounted to the ground rigidly;
   said middle frame is connected to said centre column by a cylindrical joint capable of providing translational and rotational freedom to the said centre column and said top frame along and about the Z-axis and heave and yaw actuators to control the said translational and rotational freedom;
   said centre column is connected to said top frame by a joint capable of providing rotational freedom to the said top frame about the X-axis and Y-axis and pitch and roll actuators to control the said rotational freedom.

* * * * *